(12) United States Patent  
Kim et al.

(10) Patent No.: US 11,938,836 B2  
(45) Date of Patent: Mar. 26, 2024

(54) APPARATUS AND METHOD UTILIZING PAD-MOUNTED TRANSFORMER FOR CHARGING ELECTRIC CAR

(71) Applicant: KOREA ELECTRIC POWER CORPORATION, Naju-si (KR)

(72) Inventors: Seong-Man Kim, Naju-si (KR); Hyeong-Chan Kim, Naju-si (KR); Ho-Seong Yun, Naju-si (KR); Sang-Kyoum Kim, Naju-si (KR); Min-Kab Kim, Naju-si (KR); Chang-Muk Kim, Naju-si (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 889 days.

(21) Appl. No.: 16/500,810

(22) PCT Filed: Jun. 12, 2017

(86) PCT No.: PCT/KR2017/006083  
§ 371 (c)(1),  
(2) Date: Oct. 3, 2019

(87) PCT Pub. No.: WO2018/186529  
PCT Pub. Date: Oct. 11, 2018

(65) Prior Publication Data  
US 2022/0305935 A1  Sep. 29, 2022

(30) Foreign Application Priority Data  
Apr. 5, 2017  (KR) .................. 10-2017-0044094

(51) Int. Cl.  
*H02J 7/00*  (2006.01)  
*B60L 53/62*  (2019.01)  
(Continued)

(52) U.S. Cl.  
CPC ............. *B60L 53/62* (2019.02); *B60L 53/665* (2019.02); *H02J 7/00045* (2020.01); *H02J 7/0029* (2013.01); *H02J 7/0048* (2020.01)

(58) Field of Classification Search  
CPC .... B60L 53/62; B60L 53/665; H02J 7/00045; H02J 7/0048; H02J 7/0029  
(Continued)

(56) References Cited

U.S. PATENT DOCUMENTS

| | | | |
|---|---|---|---|
| 6,421,600 B1 * | 7/2002 | Ross | B60L 5/005 180/2.1 |
| 2004/0104814 A1 * | 6/2004 | Christensen | B60L 53/66 340/426.16 |

(Continued)

FOREIGN PATENT DOCUMENTS

| | | |
|---|---|---|
| CN | 104993554 A | 10/2015 |
| CN | 106532538 A | 3/2017 |

(Continued)

OTHER PUBLICATIONS

Communication from Japanese Patent Office for Office Action dated Dec. 1, 2020 of the Japanese Patent application No. 2019-554565, which corresponds to the present application.

(Continued)

*Primary Examiner* — Alexis B Pacheco  
(74) *Attorney, Agent, or Firm* — Foundation Law Group, LLP

(57) ABSTRACT

An electric car charging apparatus using a pad-mounted transformer according to one embodiment of the present invention may include a first port configured to supply power to an electric car, a second port electrically connected to the first port and configured to receive power from a (Continued)

pad-mounted transformer, and a breaking unit configured to switch between connection and disconnection of the first port and the second port.

7 Claims, 6 Drawing Sheets

(51) Int. Cl.
  *B60L 53/66* (2019.01)
  *H02J 7/14* (2006.01)
(58) Field of Classification Search
  USPC .......................................... 320/104, 134, 109
  See application file for complete search history.

(56) References Cited

U.S. PATENT DOCUMENTS

| | | | | |
|---|---|---|---|---|
| 2009/0043450 | A1* | 2/2009 | Tonegawa | B60L 3/00 701/36 |
| 2010/0117596 | A1* | 5/2010 | Cook | H01F 38/14 320/108 |
| 2010/0225271 | A1* | 9/2010 | Oyobe | B60L 50/61 320/108 |
| 2011/0022222 | A1* | 1/2011 | Tonegawa | B60L 8/003 320/109 |
| 2011/0175569 | A1* | 7/2011 | Austin | B60L 53/18 320/109 |
| 2011/0285349 | A1* | 11/2011 | Widmer | H02J 50/60 320/108 |
| 2012/0193983 | A1 | 8/2012 | Yukizane et al. | |
| 2012/0235504 | A1* | 9/2012 | Kesler | H02J 50/70 307/104 |
| 2012/0235636 | A1* | 9/2012 | Partovi | H04B 5/0093 320/108 |
| 2013/0015812 | A1* | 1/2013 | Boyer | H02J 50/10 320/108 |
| 2013/0311017 | A1* | 11/2013 | Matsunaga | B60L 53/665 701/22 |
| 2014/0132212 | A1 | 5/2014 | Ichikawa et al. | |
| 2014/0327408 | A1 | 11/2014 | Ishii et al. | |
| 2020/0108728 | A1* | 4/2020 | Kim | B60L 53/67 |
| 2020/0290467 | A1* | 9/2020 | Gao | H02J 7/02 |

FOREIGN PATENT DOCUMENTS

| | | |
|---|---|---|
| JP | H07177657 A | 7/1995 |
| JP | H10-14014 A | 1/1998 |
| JP | 2009-159718 A | 7/2009 |
| JP | 2012-127816 A | 7/2012 |
| JP | 2012-186995 A | 9/2012 |
| JP | 2013-128337 A | 6/2013 |
| JP | 2013-178594 A | 9/2013 |
| JP | 2013-223345 A | 10/2013 |
| JP | 2014-128181 A | 7/2014 |
| JP | 2015-177701 A | 10/2015 |
| JP | 2016-047007 A | 4/2016 |
| KR | 20-2012-0000081 U | 1/2012 |
| KR | 10-2012-0139558 A | 12/2012 |

OTHER PUBLICATIONS

Utility pole and electric transformer on the street changed to charger for electric vehicle, Electric Times, Feb. 13, 2017.
Communication from Chinese Patent Office for Office Action dated Aug. 18, 2022 of the Chinese Patent application No. 201780089402.5 which corresponds to the present application.
Communication from Chinese Patent Office for Office Action dated Jan. 30, 2023 of the Chinese Patent application No. 201780089402.5 which corresponds to the present application.

* cited by examiner

APPARATUS AND METHOD UTILIZING PAD-MOUNTED TRANSFORMER FOR CHARGING ELECTRIC CAR

CROSS REFERENCE TO RELATED PATENT APPLICATIONS

This application claims the benefit under 35 U.S.C. Section 371, of PCT International Applications No. PCT/KR2017/006083 filed on Jun. 12, 2017, which claimed priority to Korean Patent Application No. 10-2017-0044094 filed on Apr. 5, 2017, the disclosures of which are hereby incorporated by the references.

TECHNICAL FIELD

The present invention relates to an electric car charging apparatus using a pad-mounted transformer and an electric car charging method.

BACKGROUND ART

Recently, since a problem of exhausting fossil fuels and an environment pollution problem due to overuse of fossil fuels become serious, research and development for use of renewable energy and eco-friendly transportation systems is actively being carried out worldwide. Electric vehicles (EVs) are attracting attention as eco-friendly transportation systems.

Spread of electric car charging infrastructures is necessary to widely spread the EVs. However, since the conventional electric car charging infrastructures need significantly large spaces only for electric car charging, the significantly large spaces hinder the spread of the electric car charging infrastructures.

DISCLOSURE

Technical Problem

The present invention is directed to providing an electric car charging apparatus capable of contributing to spread of an electric car charging infrastructure by providing an environment capable of receiving power from a pad-mounted transformer and charging an electric car and an electric car charging method.

Technical Solution

One aspect of the present invention provides an electric car charging apparatus using a pad-mounted transformer including a first port configured to supply power to an electric car, a second port electrically connected to the first port and configured to receive power from a pad-mounted transformer, and a breaking unit configured to switch between connection and disconnection of the first port and the second port.

The electric car charging apparatus using a pad-mounted transformer may further include a meter configured to measure a current, a voltage, and electric power of power passing from the first port to the second port, a processor configured to generate pad-mounted transformer abnormality information on the basis of a measurement result of the meter, and a controller configured to control a switching operation of the breaking unit on the basis of the pad-mounted transformer abnormality information.

The electric car charging apparatus using a pad-mounted transformer may further include a communicator configured to transmit the pad-mounted transformer abnormality information, wherein the processor may generate at least one piece of overcurrent information, overvoltage information, grounding information, short-circuit information, frozen information, and electric leakage information as the pad-mounted transformer abnormality information.

The electric car charging apparatus using a pad-mounted transformer may further include an input unit configured to receive charging mode information or charging capacity information, and the controller may control a switching operation time of the breaking unit on the basis of the charging mode information or the charging capacity information.

The processor may generate charging fee information on the basis of the charging mode information or the charging capacity information, and the communicator may transmit the charging fee information.

The input unit may receive billing information, the communicator may transmit the billing information and receive authentication information, and the controller may control a switching operation of the breaking unit on the basis of the authentication information.

The electric car charging apparatus using a pad-mounted transformer may further include an external box which accommodates the breaking unit and is attachable to the pad-mounted transformer or detachable from the pad-mounted transformer.

The second port may be disposed at a position at which the second port is in contact with the pad-mounted transformer in the external box.

Another aspect of the present invention provides an electric car charging method including receiving charging user information, performing a user authentication process on the basis of the charging user information and generating authentication information, releasing locking of a charger integrated with a pad-mounted transformer on the basis of the authentication information, and supplying power to an electric car from the pad-mounted transformer after the releasing of the locking of the charger.

The electric car charging method may further include measuring a current, a voltage, and electric power of the power while the power is supplied from the pad-mounted transformer to the electric car, generating pad-mounted transformer abnormality information on the basis of a measurement result of the current, the voltage, and the electric power of the power, and controlling charging stopping of the charger on the basis of the pad-mounted transformer abnormality information.

Advantageous Effects

According to one embodiment of the present invention, since an electric car charging apparatus using a pad-mounted transformer and an electric car charging method provide an environment capable of receiving power from a pad-mounted transformer and charging an electric car so as to contribute to spread of an electric car charging infrastructure.

According to one embodiment of the present invention, an electric car charging apparatus using a pad-mounted transformer and an electric car charging method can provide an electric car charging infrastructure almost without separate private use permission or digging report, have strong durability against external impacts, supply relatively stable power even in a case in which a load amount or state of a pad-mounted transformer varies, and build a stable electric car charging transaction system.

BEST MODE OF THE INVENTION

Detailed descriptions of the invention will be made with reference to the accompanying drawings illustrating specific exemplary embodiments of the invention. These embodiments will be described in detail such that the invention can be performed by those skilled in the art. It should be understood that various embodiments of the invention are different but are not necessarily mutually exclusive. For example, a specific shape, structure, and characteristic of an embodiment described herein may be implemented in another embodiment without departing from the scope and spirit of the invention. In addition, it should be understood that a position or an arrangement of each component in each disclosed embodiment may be changed without departing from the scope and spirit of the invention. Accordingly, there is no intent to limit the invention to detailed descriptions to be described below. The scope of the invention is defined by the appended claims and encompasses all equivalents that fall within the scope of the appended claims. Like numbers refer to the same or like functions throughout the description of the figures.

Hereinafter, in order to easily perform the invention by those skilled in the art, exemplary embodiments of the invention will be described in detail with reference to the accompanying drawings.

Figure 1:
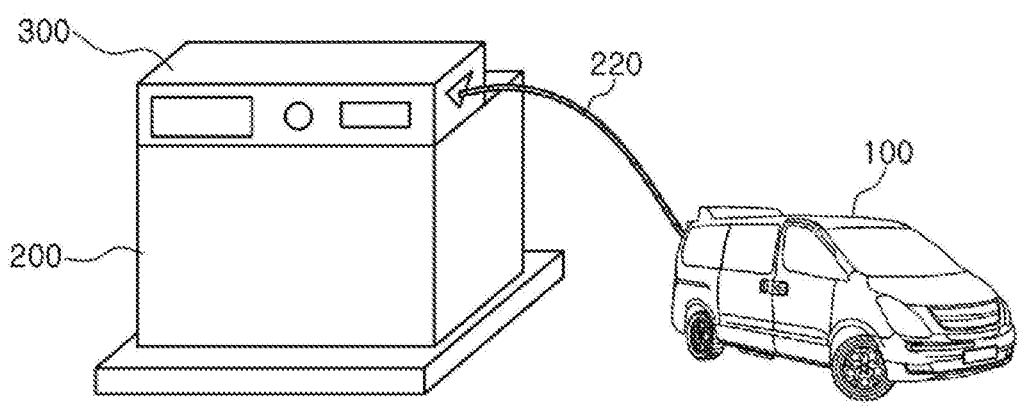
FIG. 1 is a view illustrating an electric car charging apparatus using a pad-mounted transformer according to one embodiment of the present invention.

FIG. 1 is a view illustrating an electric car charging apparatus using a pad-mounted transformer according to one embodiment of the present invention.

Referring to FIG. 1, an electric car charging apparatus 300 using a pad-mounted transformer according to one embodiment of the present invention may receive power from a pad-mounted transformer 200 and supply the power to an electric car 100.

The pad-mounted transformer 200 may be electrically connected to a power distribution line disposed in the ground and may convert high voltage power to low voltage power.

Generally, the pad-mounted transformer 200 may be installed on a road or sidewalk that the electric car 100 may easily approach.

Accordingly, in the electric car charging apparatus 300 using a pad-mounted transformer according to one embodiment of the present invention, a charging space for the electric car 100 may be secured even without requiring a wide space only for electric car charging, a length of a power cable 220 needed for electric car charging may be reduced, and durability against external impacts may be obtained.

Figure 2:
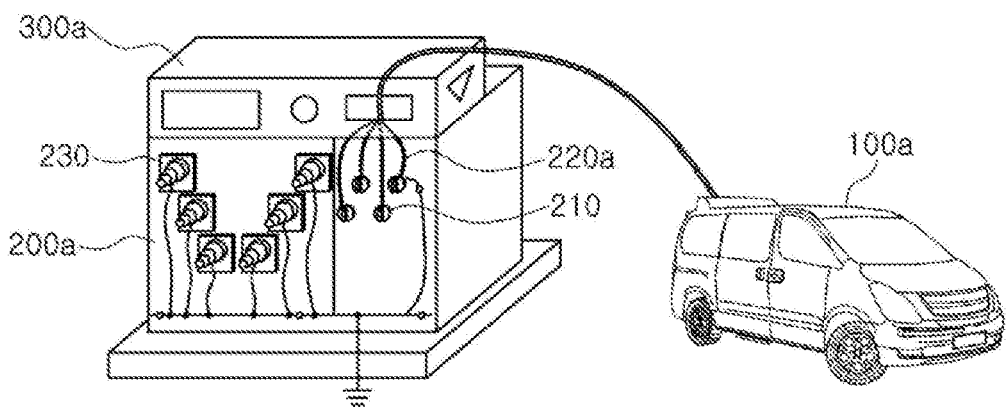
FIG. 2 is a view illustrating a pad-mounted transformer used for an electric car charging apparatus using a pad-mounted transformer according to one embodiment of the present invention.

FIG. 2 is a view illustrating a pad-mounted transformer used for an electric car charging apparatus using a pad-mounted transformer according to one embodiment of the present invention.

Referring to FIG. 2, a pad-mounted transformer 200a may include a first power terminal 210 and a second power terminal 230.

An electric car charging apparatus 300a using a pad-mounted transformer according to one embodiment of the present invention may be electrically connected to the first power terminal 210 through a power cable 220a and may supply power to the electric car 100a through a separate power cable.

The first power terminal 210 may include four low voltage terminals corresponding to an A-phase, a B-phase, a C-phase, and an N-phase, may be machined as bolt holes for the sake of convenience in connection with the power cable 220a, and may be connected to a pressed terminal of the power cable 220a.

For example, the power cable 220a may be formed of a continuous vulcanization (CV) cable or a cable of which a material has the same performance as that of the CV cable for conductivity and machinability thereof.

In addition, the electric car charging apparatus 300a using a pad-mounted transformer may be disposed on the pad-mounted transformer 200a and may include an external box which is attachable to the pad-mounted transformer 200a or which is detachable from the pad-mounted transformer 200a.

In addition, the electric car charging apparatus 300a using a pad-mounted transformer may be electrically connected to the pad-mounted transformer 200a at a position at which the electric car charging apparatus 300a is in contact with the pad-mounted transformer 200a in the external box. That is, the electric car charging apparatus 300a using a pad-mounted transformer may receive power from the pad-mounted transformer 200a even without an external power cable. Accordingly, the electric car charging apparatus 300a using a pad-mounted transformer may have strong durability against external impacts.

Figure 3:
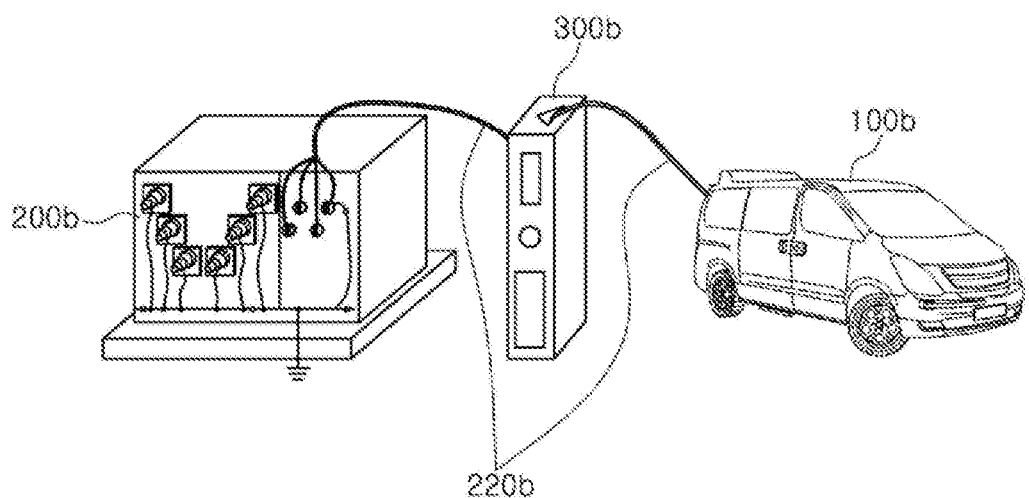
FIG. 3 is a view illustrating an arrangement of an electric car charging apparatus using a pad-mounted transformer according to one embodiment of the present invention.

FIG. 3 is a view illustrating an arrangement of an electric car charging apparatus using a pad-mounted transformer according to one embodiment of the present invention.

Referring to FIG. 3, an electric car charging apparatus 300b using a pad-mounted transformer according to one embodiment of the present invention may be spaced apart from a pad-mounted transformer 200b and electrically connected to the pad-mounted transformer 200b and an electric car 100b through power cables 220b.

The electric car charging apparatus 300b using a pad-mounted transformer may be disposed close to the pad-mounted transformer 200b so as to reduce a length of the power cable 220b and secure a parking space of the electric car 100b.

Figure 4:
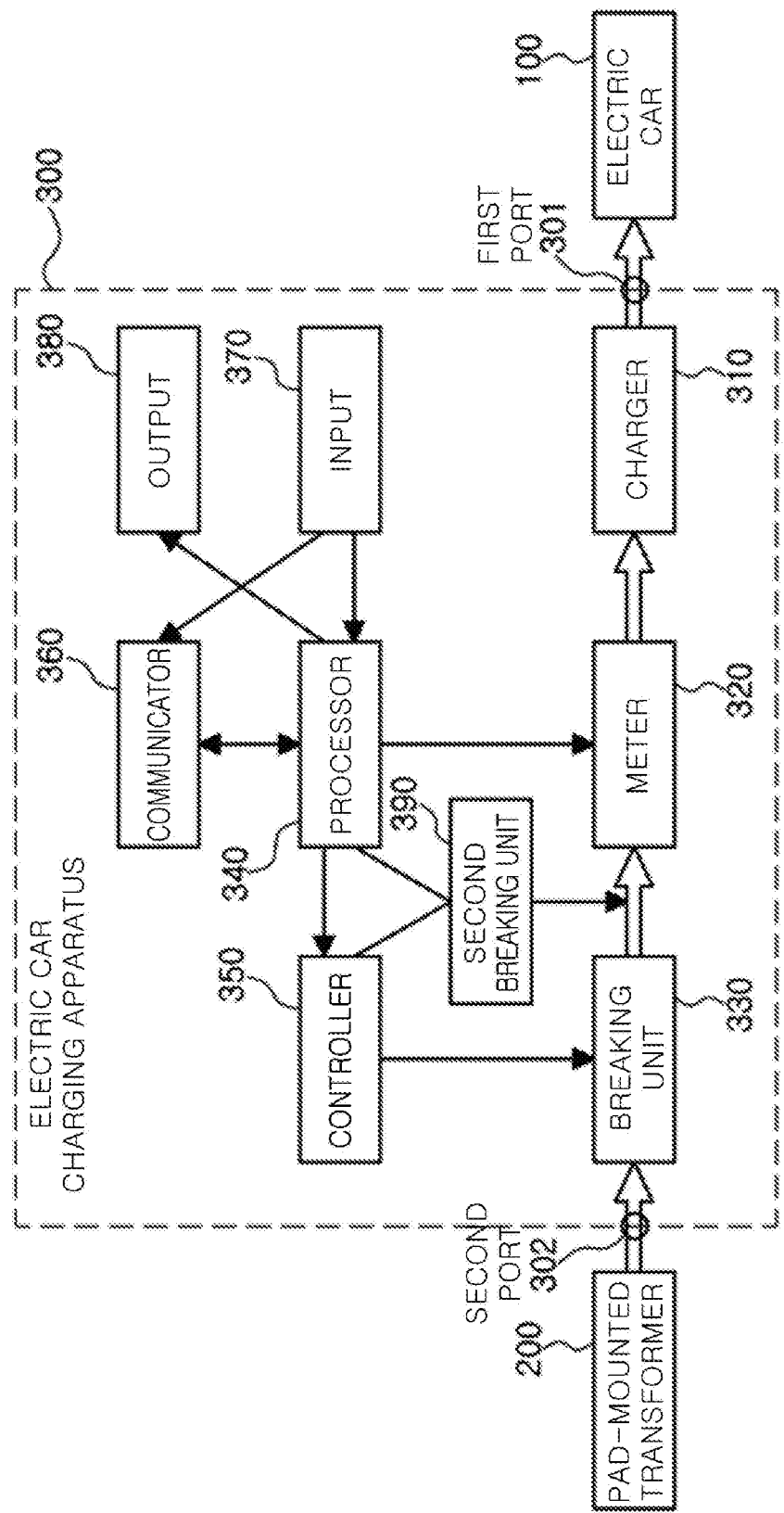
FIG. 4 is a block diagram illustrating an electric car charging apparatus using a pad-mounted transformer according to one embodiment of the present invention.

FIG. 4 is a block diagram illustrating an electric car charging apparatus using a pad-mounted transformer according to one embodiment of the present invention.

Referring to FIG. 4, an electric car charging apparatus 300 using a pad-mounted transformer according to one embodiment of the present invention may include a first port 301, a second port 302, a charger 310, a meter 320, a breaking unit 330, a processor 340, a controller 350, a communicator 360, an input unit 370, an output unit 380, and a second breaking unit 390, and may be accommodated in an external box.

The first port 301 may supply power to an electric car 100.

The second port 302 may be electrically connected to the first port 301 and may receive power from a pad-mounted transformer 200.

For example, the first and second ports 301 and 302 may be connected to power cables to supply power in a wired method or formed of coils to supply power within a short distance in a wireless method.

The charger 310 may perform a switching operation for power supplied through the second port 302. For example, the charger 310 may receive charging method information of the electric car 100 through power line in communication with the electric car 100 and determine a power voltage, a frequency, a direct current (DC) or alternating current (AC), a wired method or wireless method, a charging speed, and the like on the basis of the charging method information.

The meter 320 may measure a current, a voltage, and electric power of power supplied through the first port 301 and the second port 302. For example, the meter 320 may be provided as a power meter. A measurement result of the meter 320 may be used to generate charging fee information and may also be used to generate pad-mounted transformer abnormality information.

Here, the pad-mounted transformer abnormality information may include overcurrent information, overvoltage information, grounding information, short-circuit information, frozen information, and/or electric leakage information.

The breaking unit 330 may switch between connection and disconnection of the first port 301 and the second port 302. For example, the breaking unit 330 may be formed of a breaker or power semiconductor.

For example, the breaking unit 330 may electrically disconnect the first port 301 from the second port 302 so as to stop charging the electric car 100 on the basis of the pad-mounted transformer abnormality information.

Generally, since a load amount or state of the pad-mounted transformer 200 varies, the breaking unit 330 may switch between connection and disconnection of the first port 301 and the second port 302 on the basis of the pad-mounted transformer abnormality information so as to operate the first port 301 and the second port 302 on the basis of the load amount or state of the pad-mounted transformer 200.

Accordingly, the electric car charging apparatus 300 using a pad-mounted transformer according to one embodiment of the present invention may relatively safely and stably use power of the pad-mounted transformer 200 even in a case in which the load amount or state of the pad-mounted transformer 200 varies.

The processor 340 may generate pad-mounted transformer abnormality information on the basis of a measurement result of the meter 320.

For example, in a case in which an average current or an average voltage measured by the meter 320 is higher than a reference current, the processor 340 may generate overcurrent information or overvoltage information as the pad-mounted transformer abnormality information, in a case in which average power measured by the meter 320 is higher than reference power, the processor 340 may generate frozen information or electric leakage information as the pad-mounted transformer abnormality information, and in a case in which a peak value measured by the meter 320 is higher than a reference value, the processor 340 may generate grounding information or short-circuit information as the pad-mounted transformer abnormality information.

In addition, the processor 340 may also generate charging fee information on the basis of charging mode information or charging capacity information received from the input unit 370. That is, the processor 340 may perform a series of processes about an electric car charging transaction.

The controller 350 may control a switching operation of the breaking unit 330 on the basis of the pad-mounted transformer abnormality information or control the switching operation of the breaking unit 330 on the basis of authentication information received by the communicator 360. That is, the controller 350 may integrally control an overall operation of the electric car charging apparatus 300 using a pad-mounted transformer.

The communicator 360 may transmit the pad-mounted transformer abnormality information to a server and receive the authentication information from the server or a certification authority. Accordingly, a plurality of electric car charging apparatuses may be integrally managed by the server. For example, the communicator 360 may include an antenna and a communication modem.

In addition, the communicator 360 may transmit information about charging fee charging to a driver's terminal of the electric car 100 for billing a charging fee according to the charging fee information and transmit electric car charging state information (for example, a charging rate, an expected charging time, whether charging is completed, and whether an abnormality occurs) to the terminal in real time. Here, the communicator 360 and the terminal may communicate through a communication company.

The input unit 370 may receive charging mode information or charging capacity information from the driver of the electric car 100. Here, the charging mode information may correspond to rapid charging, medium-speed charging, or slow charging.

In addition, the input unit 370 may receive billing information from the driver of the electric car 100. For example, the billing information may correspond to at least one of various billing methods such as a credit card method, a check card method, and a mobile billing method. The billing information may be transmitted to the server, the certification authority, or a billing financial institution by the communicator 360. The server, the certification authority, or the billing financial institution may determine whether the driver of the electric car 100 is a driver subscribed to an electric car charging transection system by comparing the billing information with stored information, generate authentication information based on a determination result, and transmit the determined authentication information to the communicator 360. The electric car charging apparatus 300 using a pad-mounted transformer may refuse (for example, due to card theft or damage) or approve charging of the electric car 100 according to the authentication information.

The output unit 380 may output information about whether charging is possible on the basis of the authentication information and output the charging fee information generated by the processor 340. For example, the output unit 380 may be formed as a display apparatus and, with the input unit 370, may be formed as a human-machine interface (HMI) such as a touch screen and a key pad.

The second breaking unit 390 may be connected to the breaking unit 330 in series to switch between connection and disconnection of the first port 301 and the second port 302.

For example, the second breaking unit 390 may electrically connect the first port 301 to the second port 302 when charging of the electric car 100 starts and electrically disconnect the first port 301 from the second port 302 when the charging of the electric car 100 stops. For example, the second breaking unit 390 may switch between connection and disconnection of the first port 301 and the second port 302 at a charging start or stop time determined by the controller 350 according to the charging mode information or charging capacity information input through the input unit 370.

Figure 5:
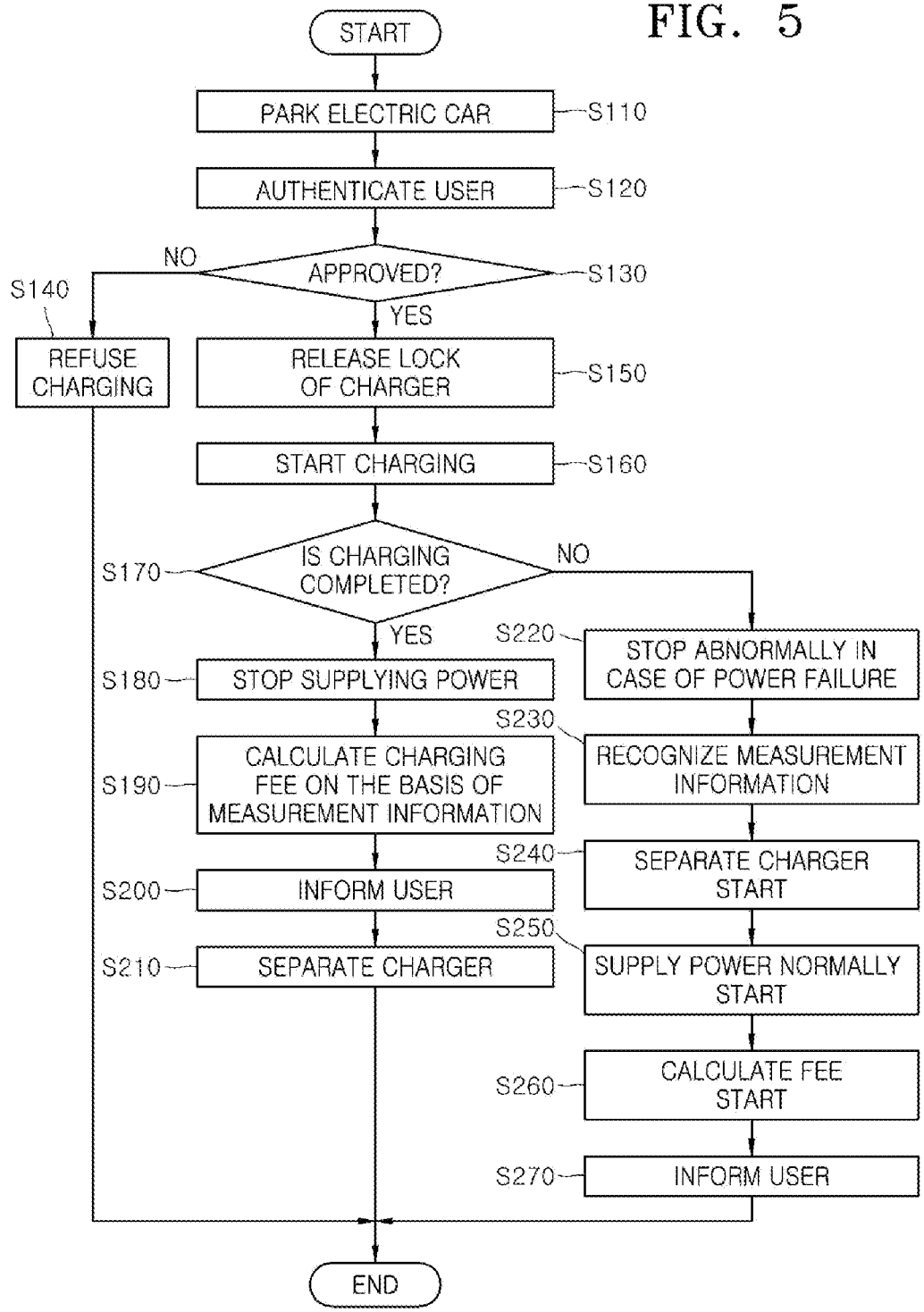
FIG. 5 is a flowchart for describing an electric car charging method according to one embodiment of the present invention.

FIG. 5 is a flowchart for describing an electric car charging method according to one embodiment of the present invention.

Referring to FIG. 5, an electric car charging apparatus may perform user authentication (S120) and determine approval of the user authentication (S130) through a communicator after an electric car is parked (S110) according to an electric car charging method according to one embodiment of the present invention.

Then, in a case in which the user authentication is refused, the electric car charging apparatus may refuse charging (S140) by controlling a breaking unit, or in a case in which the user authentication is approved, the electric car charging apparatus may release locking of a charger (S150) by controlling the breaking unit.

Then, the electric car charging apparatus may determine charging completion (S160) through the meter, block supplying of power (S180) using a second breaking unit after the charging completion, calculate a charging fee (S190) corresponding to measurement information using the processor, inform a user of charging fee information (S200) through the communicator, and electrically separate the charger from the electric car (S210).

When a case in which a power failure occurring is determined through the meter before charging is completed, the electric car charging apparatus may perform an abnormal stop (S220) using the breaking unit, recognize the measurement information (S230) through the processor, and electrically separate the charger from the electric car (S240).

Then, in a case in which power is supplied normally (S250), the electric car charging apparatus may calculate the charging fee (S260) using the processor and inform the user of charging fee information (S270) through the communicator.

In summary, the electric car charging method according to one embodiment of the present invention may include at least some of operations of receiving charging user information, performing a user authentication process and generating authentication information on the basis of the charging user information, releasing locking of the charger integrated with a pad-mounted transformer according to the authentication information, supplying power to the electric car from the pad-mounted transformer after the releasing of the lock of the charger, measuring a current, a voltage, or electric power of the power while the power is supplied from the pad-mounted transformer to the electric car, generating pad-mounted transformer abnormality information on the basis of a measurement result of the current, the voltage, or the electric power of the power, and controlling the charger to stop charging on the basis of the pad-mounted transformer abnormality information, but is not limited to the operations S110 to S270.

Figure 6:
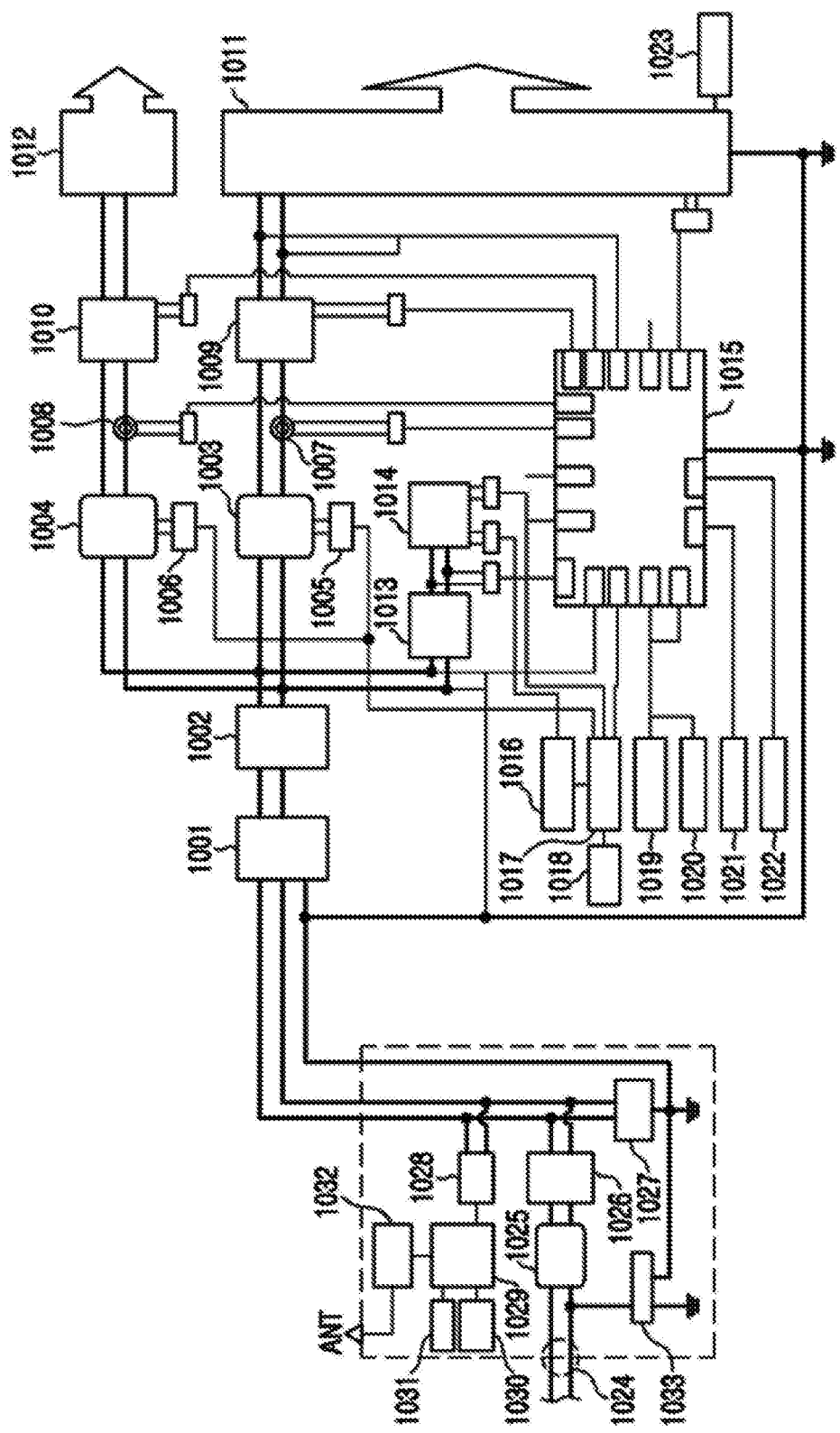
FIG. 6 is a detailed block diagram illustrating an electric car charging apparatus using a pad-mounted transformer according to one embodiment of the present invention.

FIG. 6 is a detailed block diagram illustrating an electric car charging apparatus using a pad-mounted transformer according to one embodiment of the present invention.

Referring to FIG. 6, the electric car charging apparatus may include at least some of a charger AC terminal 1001, an electric leakage breaker 1002, a first power meter 1003, a second power meter 1004, a first power meter communication terminal box 1005, a second power meter communication terminal box 1006, a first current sensor 1007, a second current sensor 1008, a first magnet contactor 1009, a second magnet contactor 1010, a charging connector 1011, a charging socket 1012, a noise filter 1013, a power supply 1014, a controller 1015, a card reader 1016, a display 1017, a speaker 1018, a lighting apparatus 1019, an emergency switch 1020, a door solenoid 1021, a plug sensor 1022, and a retractor 1023.

The charger AC terminal 1001 may electrically connect the electric car charging apparatus to an intelligent distribution box and may correspond to the second port illustrated in FIG. 4.

The electric leakage breaker 1002 may stop charging in a case in which electric leakage occurs in the electric car charging apparatus and may correspond to the breaking unit illustrated in FIG. 4.

The first power meter 1003 may measure an amount of electric charging power during charging in a first mode. For example, the first mode may be a slow mode.

The second power meter 1004 may measure an amount of electric charging power during charging in a second mode. For example, the second mode may be a rapid mode.

Measurement results of the first and second power meters 1003 and 1004 may be used to generate fee information.

The first power meter communication terminal box 1005 may transmit a measurement result of the first power meter 1003 to the controller 1015 or the outside.

The second power meter communication terminal box 1006 may transmit the measurement result of the second power meter 1004 to the controller 1015 or the outside.

The first current sensor 1007 may measure a current of power supplied to the electric car in the first mode.

The second current sensor 1008 may measure a current of power supplied to the electric car in the second mode.

A current value measured by the first or second current sensor 1007 or 1008 may be used for breaking control of the electric leakage breaker 1002 performed by the controller 1015.

The first magnet contactor 1009 may control a charging amount in the first mode through on/off switching.

The second magnet contactor 1010 may control a charging amount in the second mode through on/off switching.

The charging connector 1011 may have a structure which is electrically connected to the electric car for charging in the first mode and correspond to the first port illustrated in FIG. 4.

The charging socket 1012 may have a structure which is electrically connected to the electric car for charging in the second mode and correspond to the first port illustrated in FIG. 4.

The noise filter 1013 may filter charging power noise.

The power supply 1014 may supply operating power to the controller 1015 and convert AC power to DC power. For example, the power supply 1014 may be formed as a switching mode power supply (SMPS).

The controller 1015 may operate in the same manner as the controller and the processor illustrated in FIG. 4.

The card reader 1016 may receive billing information from the electric car or driver. For example, the billing information may correspond to at least one of various billing methods such as a credit card method, a check card method, and a mobile billing method.

The display 1017 may visually display information output by the output unit illustrated in FIG. 4.

The speaker 1018 may allow information output by the output unit illustrated in FIG. 4 to be acoustically generated.

The lighting apparatus 1019 may emit light toward the charging connector 1011 and the charging socket 1012 for the sake of convenience of the driver.

The emergency switch 1020 may stop charging according to an input of the electric car or the driver.

The door solenoid 1021 may perform a lock function of a storing box for the charging connector 1011.

The plug sensor 1022 may check whether the charging connector 1011 is disposed at a predetermined position.

The retractor 1023 may wind a charging cable connected to the charging connector 1011 around a reel. Accordingly, the retractor 1023 may prevent the charging cable from being dragged along the ground and damaged.

Referring to FIG. 6, the intelligent distribution box may include at least some of a distribution box AC terminal 1024, a third power meter 1025, an AC input breaker 1026, a surge protector 1027, a distribution box power supply 1028, a distribution box control board 1029, an image processing unit 1030, a sign controller 1031, a wireless modem 1032, and an earth ground 1033. Since the intelligent distribution box may be integrated with the electric car charging apparatus, the components included in the intelligent distribution box may also be included in the electric car charging apparatus.

The distribution box AC terminal 1024 may electrically connect the intelligent distribution box to a power distribution line.

The third power meter 1025 may measure an amount of electric power of power passing through the intelligent distribution box.

The AC input breaker 1026 may block power supplied to the electric car charging apparatus from the intelligent distribution box.

The surge protector 1027 may protect a power source from surge.

The distribution box power supply 1028 may supply operating power of the distribution box control board 1029 and convert AC power to DC power. For example, the distribution box power supply 1028 may be formed as a SMPS.

The distribution box control board 1029 may control an overall operation of the intelligent distribution box.

The image processing unit 1030 may control an image device provided on the pad-mounted transformer.

The sign controller 1031 may control a charging station sign provided on the pad-mounted transformer.

The wireless modem 1032 may operate in the same manner as the communicator illustrated in FIG. 4.

The earth ground 1033 may provide a ground voltage to the intelligent distribution box.

Meanwhile, the electric car charging method according to one embodiment of the present invention may be realized using a computing environment which includes a processor, a memory, a storage device, an input device, an output device, and a communicator. For example, the process may correspond to the above-described processor and controller, the memory may correspond to the above-described processor, the input device may correspond to the above-described input, the output device may correspond to the above-described output, and the communicator may correspond to the above-described communicator.

The terms, such as "~unit," used in the present embodiment refer to software or a hardware component such as a field-programmable gate array (FPGA) or an application specific integrated circuit (ASIC), and the terms "~unit" play certain roles. However, the terms "~unit" are not limited to software or hardware. The terms "~unit" may be formed to be included in an addressing storage medium or to reproduce one or more processors. Thus, in an example, the terms "~unit" include components, such as software components, object-oriented software components, class components, task components, processes, functions, properties, procedures, subroutines, segments of a program code, drivers, firmware, micro-codes, circuits, data, a database, data structures, tables, arrays, and variables. Functions provided by these components and the terms "~unit" may be combined with a smaller number of components and "~units" or may be subdivided into additional components and "~units." Furthermore, the components and "~units" may also be implemented to reproduce one or more central processing units (CPUs) within a device or a security multimedia card.

Although the present invention has been described with reference to the embodiments, the invention is not limited to the above-descried embodiments. Those skilled in the art may variously modify the invention without departing from the gist of the invention claimed by the appended claims.

The invention claimed is:

1. An electric car charging apparatus using a pad-mounted transformer, comprising:
   a first port configured to supply power to an electric car;
   a second port electrically connected to the first port and configured to receive power from a pad-mounted transformer; and
   a first breaking unit configured to switch between connection and disconnection of the first port and the second port;
   a second breaking unit configured to connect the first port to the second port when charging of the electric car starts and disconnect the first port from the second port when the charging of the electric car stops;
   a meter configured to measure a current, a voltage, and electric power of power passing from the first port to the second port;
   a processor configured to generate pad-mounted transformer abnormality information on the basis of a measurement result of the meter; and
   a controller configured to control a switching operation of the first breaking unit on the basis of the pad-mounted transformer abnormality information,
   wherein the processor generates at least one piece of over current information, overvoltage information, grounding information, short-circuit information, frozen information, and electric leakage information as the pad-mounted transformer abnormality information.

2. The electric car charging apparatus of claim 1, further comprising a communicator configured to transmit the pad-mounted transformer abnormality information.

3. The electric car charging apparatus of claim 1, further comprising:
   an input unit configured to receive charging mode information or charging capacity information; and
   a controller configured to control a switching operation time of the first breaking unit on the basis of the charging mode information or the charging capacity information.

4. The electric car charging apparatus of claim 3, further comprising:
   a processor configured to generate charging fee information on the basis of the charging mode information or the charging capacity information; and a communicator configured to transmit the charging fee information.

5. The electric car charging apparatus of claim 1, further comprising:
an input unit configured to receive billing information;
a communicator configured to transmit the billing information and receive authentication information; and
a controller configured to control a switching operation of the first breaking unit on the basis of the authentication information.

6. The electric car charging apparatus of claim 1, further comprising an external box which accommodates the first breaking unit and is attachable to the pad-mounted transformer or detachable from the pad-mounted transformer.

7. The electric car charging apparatus of claim 6, wherein the second port is disposed at a position at which the second port is in contact with the pad-mounted transformer in the external box.

* * * * *